Figure 1:
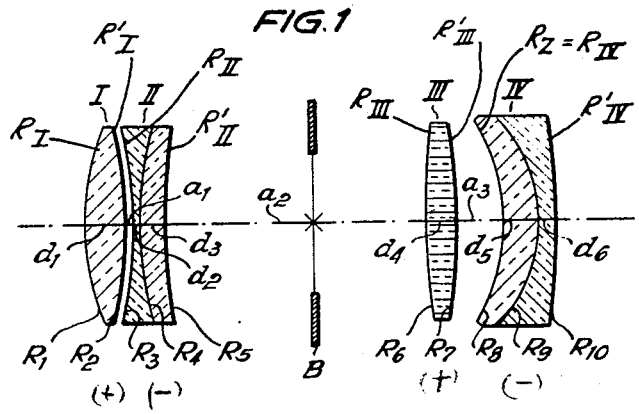

June 5, 1956    A. W. TRONNIER    2,748,657
TELE-ANASTIGMATIC OBJECTIVES OF HIGH
LIGHT TRANSMITTING CAPACITY
Filed Aug. 5, 1954

INVENTOR

United States Patent Office 2,748,657
Patented June 5, 1956

---

2,748,657
TELE-ANASTIGMATIC OBJECTIVES OF HIGH LIGHT TRANSMITTING CAPACITY

Albrecht Wilhelm Tronnier, Gottingen, Germany, assignor to Voigtlander, A. G., Braunschweig, Germany, a corporation of Germany Application August 5, 1954, Serial No. 447,971

Claims priority, application Germany September 18, 1953

5 Claims. (Cl. 88—57)

This invention relates to anastigmatic tele-objectives, and more particularly to anastigmatic photographic objectives of the tele-system type, which have high light-transmitting capacity, and the back focal length (B. F. L.) of which for the remote object is distinctly smaller than ⅓ of the equivalent focal length (E. F. L.) of the objective.

Fundamentally, objectives of this type are built in such manner that they contain a composite front member of positive total refractive power, which is turned toward the major conjugate and separated by a large air space from a likewise composite rear member which is arranged on the side of the minor conjugate and has a diverging total effect, the diaphragm being in general arranged in said large air space between the front member and rear member.

Prior art objectives of this type are built in general in such manner that the front members consist of a biconvex collecting lens and a subsequent diverging lens of unequal curvature, in the manner of objectives of the Fraunhofer type, while the diverging rear member, which follows the collecting front member in the direction of the photographic picture, is mostly a half objective of the shape of the Gauss type.

Telephoto objectives, in which the negative rear member on the image side likewise belongs to the Fraunhofer type, have been described in U. S. Patent No. 2,662,446; the biconvex collecting lens of such rear members is turned toward the positive front member and is followed on the side of the minor conjugate by a negative member of unequal curvature. A recently suggested variation of these last mentioned objectives contains on the image side a negative member, the most strongly curved concave surface of which is turned toward the collecting front member. In the most efficient systems of this type, the telephoto-effect, expressed by the reciprocal value of the ratio of back focal length to the equivalent focal length, approximately amounts to 2.5.

It has been previously suggested to increase the total performance of such anastigmatic tele-objectives by substituting one or more of their structural lens elements by cemented lens groups. Furthermore, it has been tried to obtain the desired improvement of performance by the introduction of very strong curvatures of the cemented surfaces in said cemented lens groups. These attempts have also not been successful, because very strongly curved surfaces have always essential inherent disadvantages, particularly in the case of lenses of high apertures.

The main object of the present invention is to provide novel tele-objectives of particularly high efficiency as a further development of telephoto lenses described in said U. S. Patent No. 2,662,446. This object is fully attained according to the present invention in the manner described hereinafter.

In the objectives embodying the present invention the collecting front member I, II belongs to the Fraunhofer type and is followed by a diverging rear member III, IV which likewise belongs to the Fraunhofer type. The front member is separated from the rear member by a large air space, the thickness $a_2$ of which exceeds ⅓ of the equivalent focal length of the total objective. On the side of the minor conjugate, the air space is limited by a biconvex collecting lens III, which latter is followed by a diverging lens IV of unequal curvature. This diverging lens IV has its strongest diverging outer surface $R_z$, which is a concave surface, turned toward the preceding collecting lens III. The radius of curvature of said outer surface $R_z$ distinctly exceeds 18% of the equivalent focal length of the total objective, but does not exceed 36% of the equivalent focal length of the total objective. Furthermore, the distance (measured along the optical axis) between the vertex of the last lens surface (in the meaning of the photographic use) of the front member II and the vertex of said outer surface $R_z$ of the rear member IV exceeds 40%, but is smaller than 70%, of the equivalent focal length of the total objective. By using this novel principle of construction, anastigmatic tele-objectives can be obtained, the telephoto-effect of which is distinctly higher than 3.5$\theta$.

It has been further found that the telephoto-effect of objectives embodying the present invention can be increased to exceed 4.0 if the collecting member III, which follows the diaphragm, has an inherent refractive power which is higher than 1.2 times, but does not exceed 2.4 times, the equivalent refractive power of the total objective. It has also been found that the telephoto-effect can be unexpectedly still further increased without affecting the photographic performance, if the collecting lens III of strong refractive power has the following characteristics: its front radius in the direction of the major conjugate is larger than the front radius of front lens I, but smaller than the front radius of the subsequent diverging member II of the tele-positive unit of the Fraunhofer type.

In this manner anastigmatic tele-objectives can be obtained, the telephoto-effect of which exceeds 4.4.

It is true that telephoto systems having telephoto effects in the range of 3.5 to 4.0 have been suggested several decades ago. However, these suggestions were unsuccessful, because said telephoto systems were not anastigmatic objectives. They did not have the necessary anastigmatic flatness of field which is an indispensable condition in practical use. In objectives corresponding to these older suggestions, the image formation is adversely affected in the lateral portions of the field of vision by the fact that such objectives show a curvature of field which strongly increases upon increase of the image angle and that, in addition to this, they show astigmatism which progressively increases with increasing inclination of the rays.

In contrast to the above mentioned objectives of the prior art, the anastigmatic tele-objectives of the present invention show anastigmatic flatness of field within the entire useful field of vision, so that the extensive object is in fact reproduced in the plane of the photographic emulsion. These improvements result from the application of the new principle of the invention to the objectives described above.

The individual lenses of the objectives embodying the present invention are preferably designed in a manner characterized by the following limits of radii of outer surfaces R and R' which are in contact with air. It is to be understood that for each lens, R denotes the front radius turned toward the major conjugate and R' denotes the outer radius on the rear side, which limits the respective lens on the side of the minor conjugate.

Member I $\begin{cases} 0.25f < R_I < 0.60f \\ 0.60f < -R'_I < \infty \end{cases}$ Member II $\begin{cases} 0.60f < -R_{II} < 1.50f \\ \pm f < R'_{II} < \infty \end{cases}$ Diaphragm space: $a_3 > f/3$ Member III $\begin{cases} R_I < R_{III} < -R_{II} \\ 0.50f < -R'_{III} < 2.50f \end{cases}$ $$\text{Member IV} \begin{cases} 0.18f < -R_{\text{\tiny{IV}}} - R_{\text{\tiny{IV}}} < 0.36f \\ \pm 0.5f < R'_{\text{\tiny{IV}}} < \infty \end{cases}$$

It is to be understood that $R_z$ denotes the radius of the characteristic most strongly curved diverging outer surface, which is concave toward the diaphragm and the major conjugate, of the negative rear member while $f$ denotes the equivalent focal length.

Figure 2:
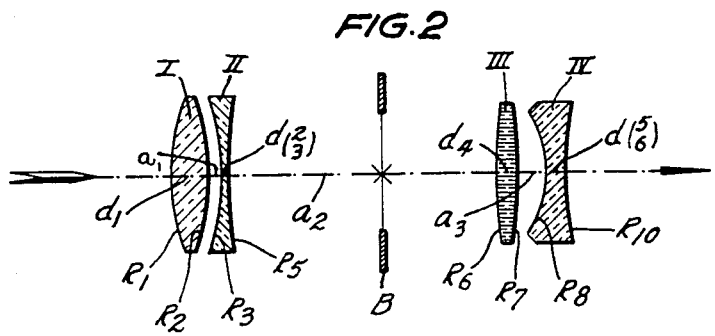

The appended drawings illustrate by way of example, and without limitation, some embodiments of the invention. Figure 1 illustrates by axial sectional views of the lenses an objective system according to the invention. Figure 2 is a similar view of an objective of the invention, in natural size and Figure 3 illustrates an embodiment of particularly high light-transmitting capacity in a similar view.

In the drawings the diaphragm is denoted B. I, II, III and IV denote the individual members of the objective; $R_1$, $R_2$, $R_3$, $R_4$, $R_5$, $R_6$, $R_7$, $R_8$, $R_9$, $R_{10}$, denote the radii of individual lens surfaces; $d_1$, $d_2$, $d_3$, $d_4$, $d_5$, $d_6$, denote the thickness of the individual lenses, measured along the optical axis; $a_1$, $a_2$, $a_3$, denote the thickness of air spaces measured along the optical axis. The glasses of the lenses are characterized, in the same order as the beforementioned symbols, by their mean refractive numbers $n_d$, based on the yellow spectral line of the helium light, and with regard to their color dispersion by the numerical value of the respective Abbe number $\nu$.

Figure 2 illustrates, by way of example, the objectives according to the invention, at an equivalent focal length of $f=150$ mm. in natural size, at a relative aperture of 1:5.9.

Figure 3:
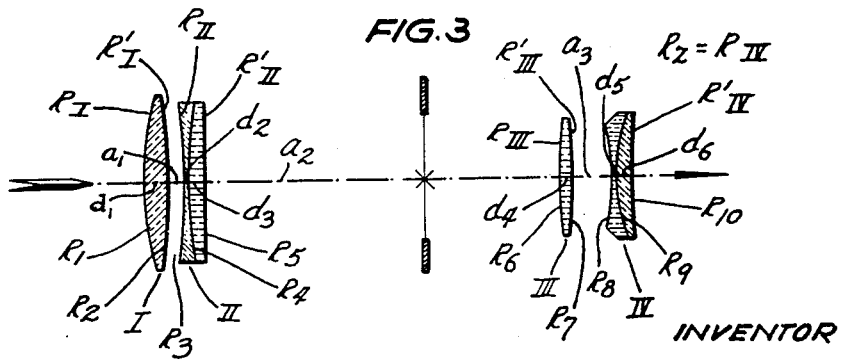

Figure 3 illustrates an embodiment of very strong light-transmitting capacity, in which the two diverging members II, IV in the front half and rear half of the objectives, respectively, consist of cemented lenses, whereby the cemented surfaces of both members are provided with predominantly chromatic correction effects. If these cemented surfaces are supposed, in addition to this, to exert a still stronger effect on mono-chromatic image defects, then, in a manner known by itself, the use of glasses is contemplated, in which there is an increased difference of the $n_d$ values of the refractive numbers, on the same. Figure 3 is based on a focal length of $f=150$ mm. and the arrangement shown in Figure 3 results in a system of high light transmitting capacity, the relative aperture of which amounts of 1:4.7 and the structure of which is proportional to the numerical example given hereinafter.

The data of the numerical table for this embodiment are referred to a focal length of $f=100$ mm. Correspondingly, the radii of lenses, as well as the thicknesses of lenses and the air spaces, measured along the optical axis, are likewise stated in millimeters. The paraxial back focal length is denoted $p_0'$. The telephoto effect amounts to 4.442.

*Numerical example*

[$f=100$ mm.   1:4.7   $p_0'=22.51$ mm.]

|   | | | | |
|---|---|---|---|---|
| I | $R_1=+38.146$ | $d_1=2.4290$ | $n_1=1.60393$ | $\nu_1=60.8$ |
|   | $R_2=-162.87$ | $a_1=2.2294$ | air | |
|   | $R_3=-89.061$ | $d_2=0.8318$ | $n_2=1.67326$ | $\nu_2=32.2$ |
| II | $R_4=+66.648$ | $d_3=1.9964$ | $n_3=1.66894$ | $\nu_3=47.1$ |
|   | $R_5=\pm$plane | $a_2=45.685$ | Diaphragm space | |
| III | $R_6=+52.706$ | $d_4=1.6790$ | $n_4=1.51566$ | $\nu_4=54.6$ |
|   | $R_7=-98.637$ | $a_3=5.1575$ | air | |
|   | $R_z=R_8=-24.687$ | $d_5=0.5989$ | $n_5=1.66894$ | $\nu_5=47.1$ |
| IV | $R_9=+21.302$ | $d_6=1.6970$ | $n_6=1.67326$ | $\nu_6=32.2$ |
|   | $R_{10}=+149.92$ | | | |

Thus $a_2=45.685$ is larger than 33.333.

The radius of curvature of the surface $R_z=R_8$ is 24.687, i. e. larger than 18.00 and smaller than 36.00.

The distance between the last surface of the front half of the objective, i. e. the surface denoted $R_5$, and the characteristic diverging surface, i. e. $R_z=R_8$, is equal to the sum of the surface distances $a_2+d_4+a_3=52.5395$, i. e. it is larger than 40.00 and is smaller than 70.00.

The positive refractive power of member III is $$\varphi_{III}=15.0 \text{ dptr.}$$

and thus amounts to 1.50 times the equivalent refractive power of the total objective, i. e. it is higher than 1.2 times, but does not exceed 2.4 times, the value of the latter.

Furthermore $R_6=52.706$ is larger than $R_1=38.146$ and smaller than $|R_3|=89.061$.

What is claimed is:

1. Tele-anastigmatic objective of high light transmitting capacity, comprising a composite collecting front system and a composite diverging rear system, which are separate by a large air space, in which the diaphragm is inserted; said front system turned to the major conjugate, as well as said rear system, having the design of the Fraunhofer objective type and thus consist of a biconvex collecting lens and a subsequent diverging lens of unequal curvature, the most strongly curved outer surface of which is a diverging concave surface turned to the major conjugate; the thickness of the large air space, measured along the optical axis, between the rear surface of the last lens of the collecting front half and the front vertex of the biconvex lens-element in the rear half, which is directed toward the diaphragm and precedes the diverging element of the rear half, being larger than ⅓ of the equivalent focal length of the total objective; the last member of the total objective in the meaning of the photographic use, positioned on the side of the minor conjugate, having a strong negative refractive power and its characteristic, most strongly diverging outer surface turned to the preceding biconvex member of the rear half, as a concave surface, the radius of curvature of which is distinctly larger than 18% of the equivalent focal length, but does not exceed 36% of the latter and the vertex of which is spaced from the vertex of the last surface of the front half on the side of the major conjugate, at a distance, measured along the optical axis, which is larger than 40% of the equivalent focal length of the total objective and is smaller than 70% of the equivalent focal length of the total objective.

2. Objective as claimed in claim 1, in which the inherent refractive power of the collecting member of the rear half, which limits the diaphragm space on the side of the minor conjugate and precedes the diverging element of said rear half, is larger than 1.2 times the equivalent refractive power of the total objective but does not exceed 2.4 times the equivalent refractive power of the total objective.

3. An objective as claimed in claim 1, in which the radius of curvature of the front surface limiting the diaphragm space on the side of the minor conjugate, of the collecting member following the diaphragm space and preceding the diverging member of the rear half, is larger than the front radius of the first front lens on the side of the major conjugate, but smaller than the absolute value of the front radius of the diverging member which follows said first front member, said surface being concave relative to the side of the major conjugate.

4. Objective as claimed in claim 1, characterized by the following features:

$$\text{Member I} \begin{cases} 0.25f < R_1 < 0.60f \\ 0.60f < -R_1' < \infty \end{cases}$$

$$\text{Member II} \begin{cases} 0.60f < -R_{II} < 1.50f \\ \pm f < R'_{II} \infty \end{cases}$$

Diaphragm space: $a_2 > f/3$

Member III $\begin{cases} R_I < R_{III} < -R_{II} \\ 0.50f < -R'_{III} < 2.50f \end{cases}$ Member IV $\begin{cases} 0.18f < -R_2 = -R_{IV} < 0.36f \\ \pm 0.5f < R'_{IV} < \infty \end{cases}$ wherein the symbols $R_I$ to $R_{IV}$ denote the outer radii directed toward the major conjugate of members I-IV and $R'_I$ to $R'_{IV}$ the corresponding outer radii directed toward the minor conjugate of each of these members and f denotes the equivalent focal length of the objective.

5. Objective as claimed in claim 1 characterized by meeting the following structural conditions:

Member I $\begin{cases} R_I = +0.38f \\ R'_I = -1.6f \end{cases}$

Member II $\begin{cases} R_{II} = -0.9f \\ R'_{II} = \text{plane} \end{cases}$

Diaphragm space: $a_2 = 0.45f$

Member III $\begin{cases} R_{III} = +0.5f \\ R'_{III} = -1f \end{cases}$

Member IV $\begin{cases} R_2 = R_{IV} = -0.24f \\ R'_{IV} = +1.5f \end{cases}$ based on the equivalent focal length as the unit, wherein the symbols $R_I$ to $R_{IV}$ denote the outer radii directed toward the major conjugate of members I-IV and $R'_I$ to $R'_{IV}$ the corresponding outer radii directed toward the minor conjugate of each of these members and f denotes the equivalent focal length of the objective.

References Cited in the file of this patent

UNITED STATES PATENTS

| | | |
|---|---|---|
| 2,380,207 | Aklin | July 10, 1945 |
| 2,541,485 | Schade et al. | Feb. 13, 1951 |
| 2,576,436 | Baker | Nov. 27, 1951 |
| 2,662,446 | Tronnier | Dec. 15, 1953 |

FOREIGN PATENTS

| | | |
|---|---|---|
| 316,246 | Germany | Nov. 24, 1919 |
| 222,709 | Great Britain | Oct. 9, 1924 |